(12) United States Patent
DeLuca et al.

(10) Patent No.: US 6,313,732 B1
(45) Date of Patent: Nov. 6, 2001

(54) ADVERTISER PAYS INFORMATION AND MESSAGING SYSTEM, APPARATUS AND METHOD

(75) Inventors: Michael J. DeLuca; Joan S. DeLuca, both of Boca Raton; Douglas R. Kraul, Parkland, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/156,711

(22) Filed: Sep. 18, 1998

Related U.S. Application Data

(63) Continuation of application No. 08/627,642, filed on Apr. 4, 1996, now Pat. No. 5,870,030.

(51) Int. Cl.$^7$ ........................................................ G09F 9/00
(52) U.S. Cl. ................ 340/7.2; 235/462.05; 235/462.14; 235/462.46; 340/5.4
(58) Field of Search ........................ 235/462.05, 462.14, 235/462.46; 340/7.2, 5.4, 5.61, 5.74, 5.91

(56) References Cited

U.S. PATENT DOCUMENTS

| | | | |
|---|---|---|---|
| 4,800,543 | * | 1/1989 | Lydon-James et al. ............... 368/10 |
| 5,459,458 | * | 10/1995 | Richardson et al. ............ 340/825.52 |
| 5,606,740 | * | 2/1997 | Niratsuka et al. ................... 455/343 |
| 5,630,207 | * | 5/1997 | Gitlin et al. ......................... 455/54.1 |
| 5,751,257 | * | 5/1998 | Sutherland ................................ 345/2 |
| 5,761,610 | * | 6/1998 | Sorensen et al. ....................... 455/89 |
| 5,767,896 | * | 6/1998 | Nemirofsky ........................... 348/13 |
| 5,789,732 | * | 8/1998 | McMahon et al. .................. 235/487 |
| 5,870,030 | * | 2/1999 | DeLuca et al. ................. 340/825.44 |

\* cited by examiner

Primary Examiner—Michael Horabik
Assistant Examiner—M Shimizu
(74) Attorney, Agent, or Firm—Randi L. Dulaney

(57) ABSTRACT

A system and apparatus for permitting a user of a selective call receiver (31) to receive a certain number of personal messages and information service updates without paying a fee for such services in return for reading advertisements wirelessly transmitted to the selective call receiver. The user is allowed to read the advertisements at any time prior to receiving the personal messages and information service updates. The certain number is proportional to the number of advertisements read. The certain number can be increased by the user responding to questions within advertisements using reverse channel messaging capabilities of a selective call transceiver (32), or by using a conventional telephone (22).

17 Claims, 12 Drawing Sheets

US 6,313,732 B1

ADVERTISER PAYS INFORMATION AND MESSAGING SYSTEM, APPARATUS AND METHOD

RELATED APPLICATION

This application is a continuation of Ser. No. 08/627,642, filed Apr. 4, 1996 U.S. Pat. No. 5,870,030 issued Feb. 9, 1999, which is hereby fully incorporated by reference herein and assigned to Motorola, Inc.

FIELD OF THE INVENTION

This invention relates in general to wireless communications and in particular to a system and apparatus for receiving advertisements through a selective call receiver.

BACKGROUND OF THE INVENTION

It is well known that paging system infrastructure operators derive revenue for selectively transmitting messages to persons carrying selective call receivers or selective call transceivers, hereinafter collectively referred to as pagers. Usually such messages are personal messages transmitted to one pager, although at times such messages are group messages transmitted to more than one pager. A user of the pager pays a fee to the paging infrastructure operator for such service either on a per message basis or on a flat rate for a predetermined time period. It is also well known that the paging infrastructure operator or another entity provides information services such as stock prices, weather reports, traffic reports, sports scores, etc., to users of pagers for a fee. Such services are customized to the needs and desires of each pager user; however, the information received through such services does not comprise personal messages. The fee for such information services usually depends upon the oftenness and quantity of information transmitted. Such fee typically is paid directly or indirectly to the other entity that provides the information. Collectively, the transmission of personal messages and the transmission of information services comprise paging services. In any event, the user of the pager pays for the paging services received on the pager.

Attempts have been made to provide paging services without the user of the pager paying any money for the services. One known method has been to transmit an advertisement with every personal message such that the pager displays the advertisement before the pager displays the personal message. With such known method, an advertiser pays for the paging services. Disadvantageously, with this prior art method, users of pagers must view every advertisement, including those advertisements that the users do not consider applicable to their interests. Further, known methods fail to provide to the user an option to bypass advertisements and instead pay for paging services. Finally, with known methods it is impracticable to transmit an advertisement with every update, such as a stock price update, transmitted as part of an information service.

Therefore, what is needed is an improved method and apparatus for providing free paging services to pager users through the use of advertisements in a way that encourages the user to ponder the content of advertisements transmitted to the user's pager.

DETAILED DESCRIPTION OF THE PREFERRED EMBODIMENT

Figure 1:
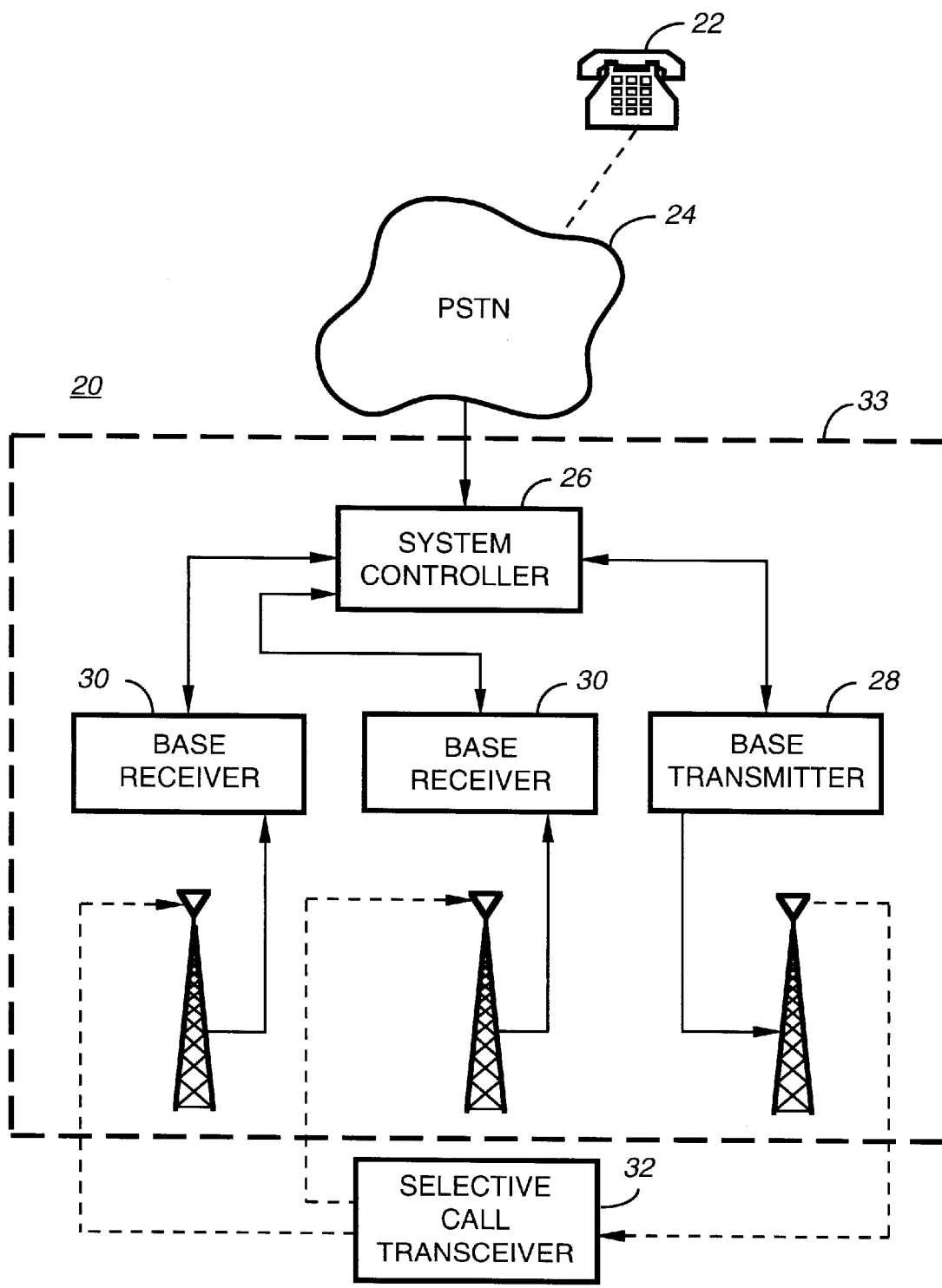
FIG. 1 is a block diagram of a communication system in accordance with the preferred embodiment of the present invention.

Referring to FIG. 1, an electrical block diagram of a wireless communication system, preferably a wireless selective call communication system, or system 20, is shown in accordance with the preferred embodiment of the present invention. The infrastructure of the system comprises a message input device, such as a conventional telephone 22, connected by a conventional public switched telephone network (PSTN) 24 to a system controller 26. The system controller 26 oversees the operation of at least one radio frequency transmitter 28 and a plurality of fixed radio frequency receivers, or receivers 30, and encodes and decodes inbound and outbound messages into formats that are compatible with land line message switches. The system controller 26 also includes an encoder and a decoder and functions to encode and decode paging messages to and from selective call transceivers, or transceivers 32. The system controller 26, the at least one radio frequency transmitter 28, and the plurality of fixed radio frequency receivers comprise an infrastructure 33 that is preferably fixed.

The system controller 26 queues data and stored messages for transmission to the selective call transceivers 32. A subscriber data base 40 (see FIG. 2) in the system controller 26 stores information relevant to each subscriber's transceiver, including a correlation between the unique address assigned to each transceiver and the telephone number used within the PSTN 24 to route messages to each transceiver 32, as well as other subscriber determined preferences.

The system controller 26 schedules transmissions of messages and acknowledgments from the selective call transceivers 32. These transmissions include demand type transmissions from the transceivers, such as acknowledgments to messages that have been transmitted by the system controller 26 and responses to messages such as status inquiries transmitted from the system controller 26. The scheduled transmissions can also include non-demand transmissions from the transceivers, such as messages being held by the transceivers, about which the transceivers have informed the system controller 26 within a previous message or acknowledgment transmitted to the system controller 26 by the transceiver. As will be described in more detail below, a scheduled reverse channel is a portion of the total time available in a single radio channel frequency that is time shared for both forward and reverse channels. Alternatively, the scheduled reverse channel is some portion of the time available, or all the time available, in a second radio carrier frequency that is different from the forward channel radio frequency.

Figure 2:
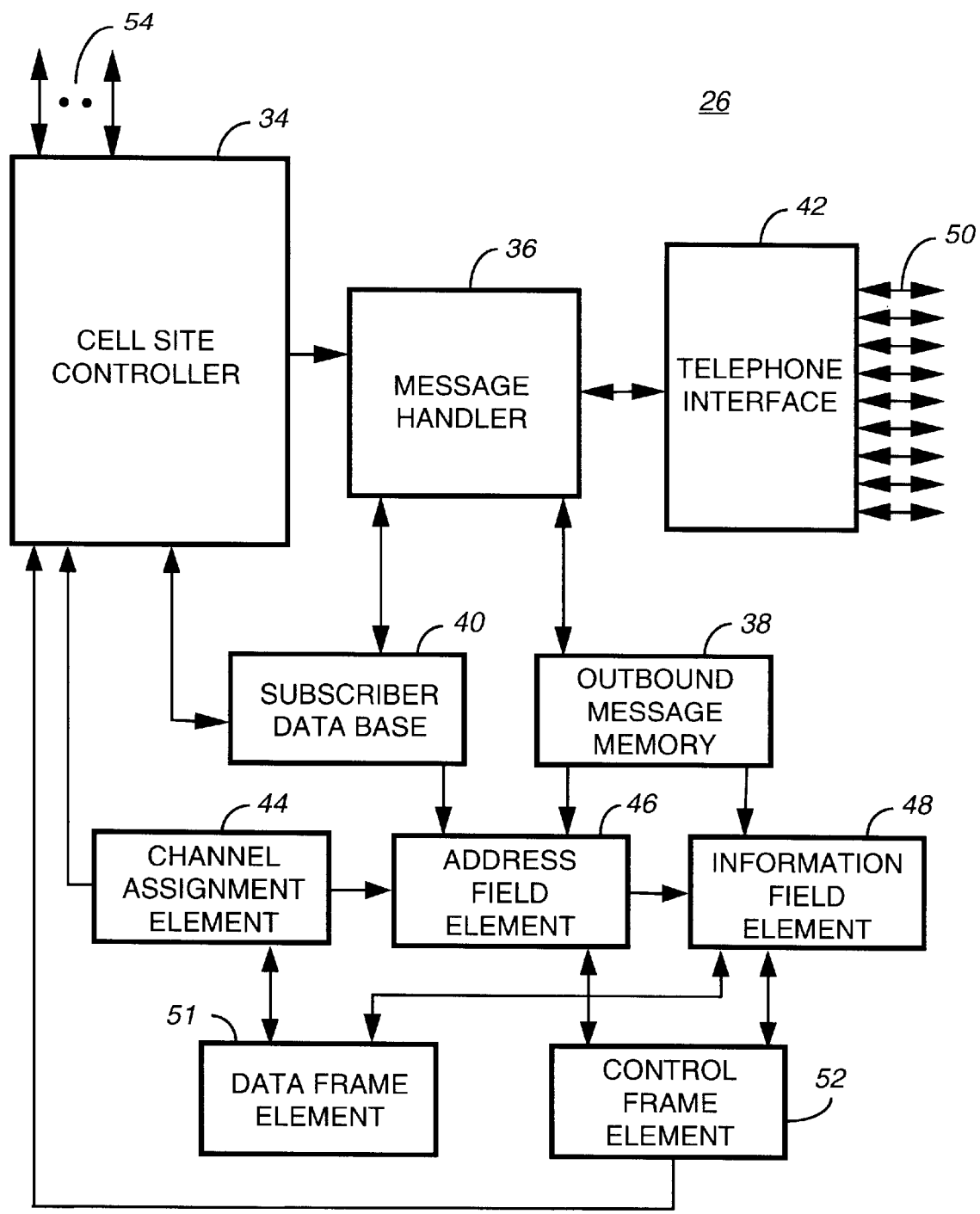
FIG. 2 is an electrical block diagram of the system controller used in the communication system of FIG. 1.

Referring now to FIG. 2, the system controller 26 comprises a cell site controller 34, a message handler 36, an outbound message memory 38, a subscriber data base 40, a telephone interface 42, a channel assignment element 44, an address field element 46, an information field element 48, a data frame element 51, and a control frame element 52. The cell site controller 34 is coupled to the radio frequency transmitter 28 and receivers 30 (FIG. 1) by links 54. The cell site controller 34 couples outbound messages including selective call addresses to the transmitter and receivers and controls the transmitter and receivers to transmit protocol cycles that include the outbound messages. The cell site controller 34 also processes inbound messages from the transceivers 32. The inbound messages are received by the transmitter and the plurality of receivers, and are coupled to the cell site controller 34. The message handler 36, which routes and processes messages, is coupled to the telephone interface 42, the subscriber data base 40, and the outbound message memory 38. The telephone interface 42 handles the PSTN 24 physical connection, connecting and disconnecting telephone calls at the telephone links 50, and routing the audio signals between the telephone links 50 and the message handler 36.

The subscriber data base 40 stores information for each subscriber, including a correlation between a selective call address assigned to each selective call transceiver 32 and the telephone number used within the PSTN 24 to route messages and telephone calls to each transceiver 32, as well as other subscriber determined preferences. The outbound message memory 38 is for storing a queue of messages that are queued for delivery to at least one of the plurality of transceivers 32, wherein each message of the queue of messages is associated with a selective call address, also stored in the outbound message memory 38, of one of the plurality of transceivers 32 for which each message is intended. The message handler 36 schedules outbound messages and the selective call addresses associated therewith within a transmission cycle. The message handler 36 also determines response schedules for response messages that minimize contention of messages at the transmitter and receivers, and includes response timing information in outbound messages so that transceivers 32 will respond according to the response schedule. The message handler 36 identifies an inbound message as being a response message associated with one of the transceivers in the subscriber data base 40, and identifies the response message as being associated with one of the outbound messages in the outbound message memory 38. The message handler 36 then further processes the outbound and response messages according to their content. The cell site controller 34, the message handler 36, the outbound message memory 38, the subscriber data base 40, and the telephone interface 42, are conventional elements of the system controller 26.

The invention preferably operates with a one-way paging communication protocol such as the Motorola Flex™ system described in U.S. Pat. No. 5,168,493 entitled "Time Division Multiplexed Selective Call System" issued Dec. 1, 1992 to Nelson et al., assigned to the assignee of the present invention, and which is hereby incorporated by reference herein. Alternatively, the invention preferably operates with the Motorola ReFlex™ two-way wireless paging protocol described in detail in the following United States patents assigned to the assignee of the present invention: U.S. Pat. No. 5,475,863 entitled "Method and Apparatus for Identifying a Transmitter in a Radio Communication System" issued Dec. 12, 1995 to Simpson et al.; U.S. Pat. No. 5,712,624 entitled "Method and Apparatus for Optimizing Receiver Synchronization in a Radio Communication System" issued Jan. 27, 1998 to Ayerst, et al.; U.S. Pat. No. 5,521,926 entitled "Method and Apparatus of Improved Message Reception at a Fixed System Receiver" issued May 28, 1996 to Ayerst et al.; U.S. Pat. No. 5,638,369 entitled "Method and Apparatus for Inbound Channel Selection in a Communication System" issued Jun. 10, 1997 to Ayerst et al.; and U.S. Pat. No. 5,737,691 entitled "A System and Method for Allocating Frequency Channels in a Two-way Messaging Network" issued Apr. 7, 1998 to Wang et al., which are hereby incorporated by reference herein. It should be appreciated that other communication protocols are also contemplated.

A paging system in accordance with the preferred embodiment of the present invention comprises a fixed portion and a portable portion. The fixed portion comprises a wireless messaging infrastructure, or infrastructure 33, that provides interfacing between a pager and typically the PSTN 24 for communication of information with the pager. The operation of such an infrastructure 33 is well known to those skilled in the art. Preferably, the infrastructure includes one of a Motorola MPS2000 paging terminal and a Motorola M15 paging terminal for use with the Flex one-way protocol. A more detailed description of the hardware of the infrastructure is described in the *MPS2000 Product Description*, the *MPS2000 Manual Set*, the *M15 Series System Overview*, and the *M15 Series Manual Set*, available for sale to the public as Part No. 6880451F17, Part No. 6880450F50-0, Part No. 6880451F35, and Part No. 6880450F60-0, respectively, from Motorola Paging Products Group, Fort Worth, Tex.

Alternatively, the infrastructure 33 is a two-way paging infrastructure modified to perform operations in accordance with the invention. The two-way paging infrastructure has a fixed portion including at least one base station, for communicating with the portable portion utilizing the ReFlex™ protocol and coupled by communication links to a system controller that controls the at least one base station. The hardware of the system controller preferably includes a Wireless Messaging Gateway (WMG™) Administrator™ paging terminal, a RF-Conductor!™ message distributor, and a RF-Usher!™ multiplexer, manufactured by Motorola, Inc. The system controller has software elements and preferably runs under a UNIX operating system. The hardware of the base station preferably includes a Nucleus® Orchestra!™ transmitter and a RF-Audience!™ receiver, manufactured by Motorola, Inc. A more detailed description of the hardware of the system controller and of the base station is described in "*Introduction to the Wireless Concert!™*", in "The Wireless Concert!™ *Overview and Network Design*" and in "*The Wireless Message Gateway™ Product Specification*", published by Motorola, Inc., which are available for sale to the public as Part No. 6880491G01, Part No. 6880491G04 and Part No. 6880491G07, respectively, from Motorola Paging Products Group, Fort Worth, Tex., and which are hereby incorporated by reference herein. It will be appreciated that other similar hardware can be utilized for the system controller and base stations.

Each of the at least one base station transmits or receives radio signals to or from the portable portion via antennas. The radio signals comprise selective call addresses and message transactions between the base stations and the pagers. The message transactions include both personal messages and information services data. The system controller preferably is coupled by conventional telephone links to PSTN for receiving selective call messages, i.e., messages intended for one or more pagers. The selective call messages comprise voice and data received from the PSTN using, for example, a conventional telephonic-type device or a computer-type device coupled to the PSTN in a manner well known in the art.

The portable portion comprises a plurality of paging receivers 31 (see FIG. 5) and transceivers such as pager 32. Each paging transceiver includes a transmitter and a receiver. The operation of a paging transceiver is well known in the art and is described more fully in U.S. Pat. No. 5,124,697 entitled "Acknowledge Back Pager" issued Jun. 23, 1992 to Moore; U.S. Pat. No. 5,153,582 entitled "Method and Apparatus for Acknowledging and Answering a Paging Signal" issued Oct. 6, 1992 to Davis; and U.S. Pat. No. 4,875,038 entitled "Frequency Division Multiplexed Acknowledge Back Paging System" issued Oct. 17, 1989 to Siwiak et al., which are assigned to the assignee of the present invention and which are hereby incorporated by reference herein. The paging transceiver, or pager 32, is preferably a Motorola Tango™ pager and has a microcomputer 80 modified to perform the operations described and shown in this specification. The Motorola Tango pager is compatible with the ReFlex protocol. The Tango pager is described more fully in the *Motorola Product Family* 255 *Service Manual* published 1995 by Motorola, Inc., and in the *Motorola Product Family* 255 *Series Controller Supplement*, published 1995 by Motorola, Inc., which are available for sale to the public from Motorola Paging Products Group, Boynton Beach, Fla. as part No. 6881024B80 and part No. 68881104B36, respectively, and which are hereby incorporated by reference herein.

Figure 3:
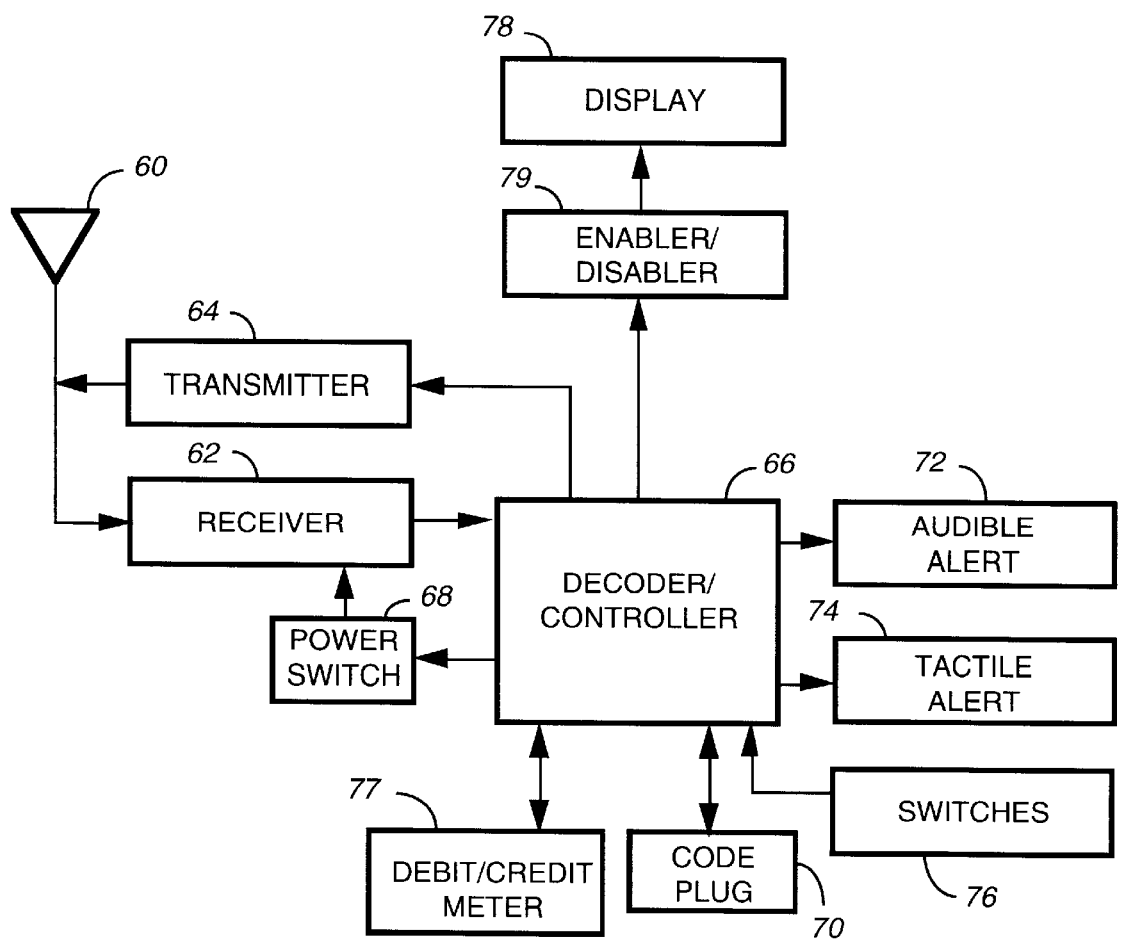
FIG. 3 is an electrical block diagram of the selective call transceiver shown in FIG. 1.

FIG. 3 is an electrical block diagram of a selective call transceiver 32 in accordance with the preferred embodiment of the present invention. The selective call transceiver 32 comprises an antenna 60 for intercepting transmitted radio frequency (RF) signals. The antenna is coupled to an input of a receiver 62 and an output of a reverse channel transmitter 64. The RF signals are preferably selective call (paging) message signals that provide a receiver address and an associated message, such as numeric or alphanumeric message. The receiver 62 processes the RF signal and produces at the output a data stream representative of a demodulated address and message information. The demodulated address and message information are coupled into the input of a decoder/controller 66 that processes the information in a manner well known in the art. A power switch 68, coupled to the decoder/controller 66, is used to control the supply of power to the receiver 62 and the reverse channel transmitter 64.

When an address that has been pre-associated with a selective call transceiver is received by the decoder/controller 66, the received address is compared with one or more addresses stored in a code plug (or code memory) 70, and when a match is detected an alert signal is generated to alert a user 71 that a selective call message, or page, has been received. The alert signal is directed to an audible alerting device 72 for generating an audible alert or to a tactile alerting device 74 for generating a silent vibrating alert. Switches 76 allow the user of the selective call receiver to select between an audible alert and a tactile alert in a manner well known in the art.

The message information that is subsequently received is stored in memory 88 (FIG. 4) and can be accessed by the user 71 for display using one or more of the switches 76 that provide such additional functions as reset, read, and delete, etc. Specifically, by the use of appropriate functions provided by the switches 76, the stored message is recovered from memory 88 and processed by the decoder/controller 66 for displaying by a display 78 which enables the user to view the message.

Figure 4:
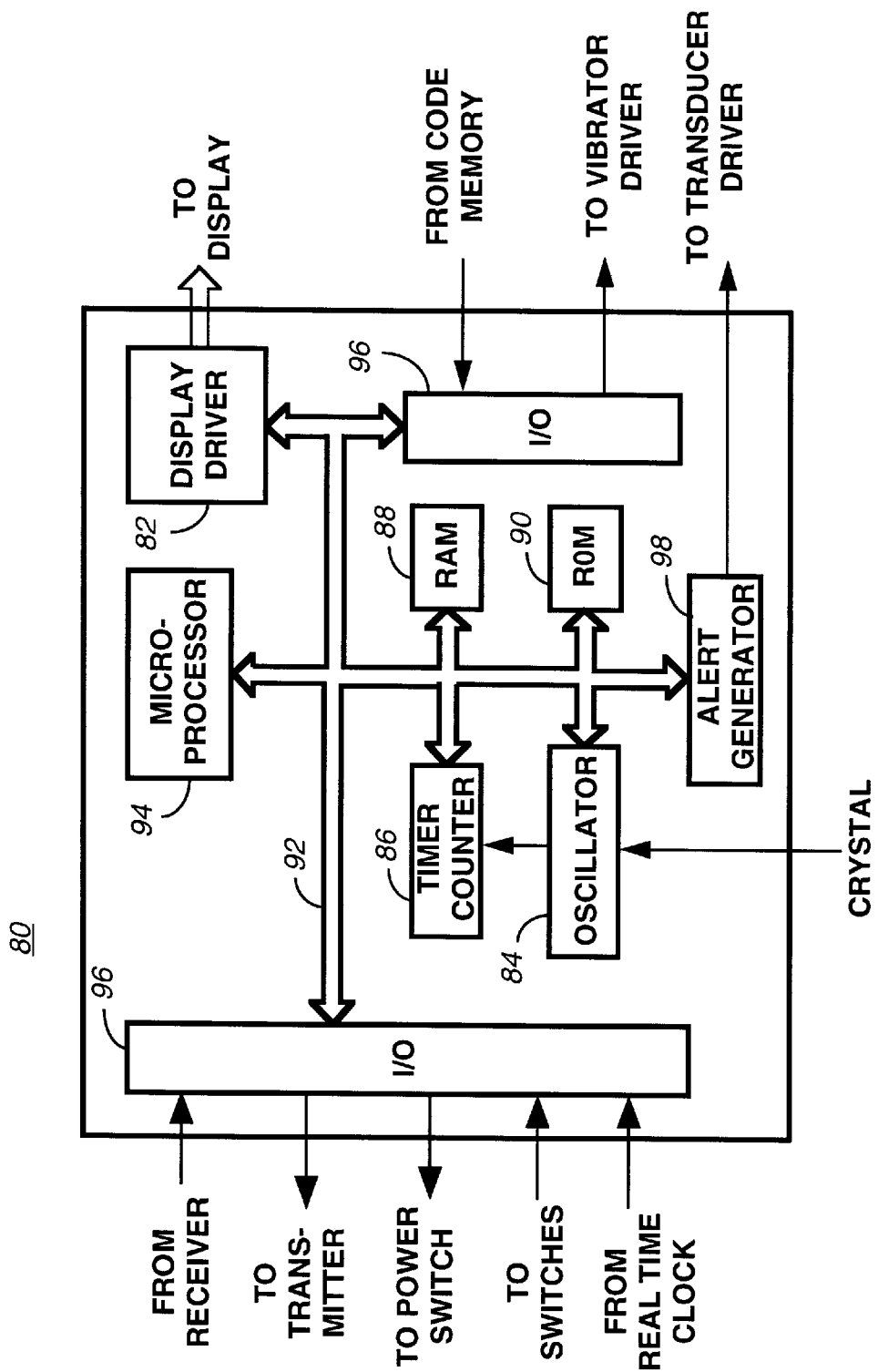
FIG. 4 is an electrical block diagram of a microcomputer used in the selective call transceiver of FIG. 3.

The decoder/controller 66 of FIG. 3 can be constructed utilizing a microcomputer 80, as shown in FIG. 4. The microcomputer 80 preferably includes a display driver 82. The microcomputer 80 includes an oscillator 84 that generates the timing signals utilized in the operation of the microcomputer 80. A crystal, or crystal oscillator (not shown) is coupled to the inputs of the oscillator 84 to provide a reference signal for establishing the microcomputer timing. A timer/counter 86 couples to the oscillator 84 and provides programmable timing functions that are utilized in controlling the operation of the receiver. A RAM (random access memory) 88 is utilized to store variables derived during processing, as well as to provide storage of message information that are received during operation as a selective call receiver. A software element stores the subroutines that control the operation of the receiver, as is well known to those skilled in the art. The software element resides in memory, preferably read-only memory (ROM) 90. It will be appreciated that in many microcomputer implementations, the programmable-ROM (PROM) memory area can be provided by an EEPROM (electrically erasable programmable read only memory). The oscillator 84, timer/counter 86, RAM 88, and ROM 90 couple through an address/data/control bus, or bus, 92 to a microprocessor 94, preferably a Motorola M68C11PH8, that performs the instructions and controls the operations of the microcomputer 80. A person skilled in the art of programming modifies the software using a *Motorola HC*11 *Reference Manual*, published 1991 by Motorola, Inc., and using a *Motorola MC68HC11PH8 Technical Data*, published 1995 by Motorola, Inc., Part No. M68HC11RM/AD and Part No. MC68HC11PH8/D, respectively, which are available for sale to the public from Motorola Literature Distribution, Phoenix, Ariz.

The demodulated data generated by the receiver is coupled into the microcomputer 80 through an input/output port, or I/O port, 96. The demodulated data is processed by the microprocessor 94 and when the received address is the same as the address stored in the code-plug memory 70 which couples into the microcomputer 80 through an I/O port 96, the message, if any, is received and stored in RAM 88. Recovery of the stored message, and selection of the predetermined destination address, is provided by the switches that are coupled to the I/O port 96. The microcomputer then recovers the stored message, and directs the information over the bus 92 to the display driver 82 that processes the information and formats the information for presentation by a display. The display is preferably an LCD (liquid crystal display) because the LCD is advantageously light absorptive and is readable by conventional bar code scanners. At the time a selective call receiver address is received, the alert signal is generated which can be routed through the bus 92 to an alert generator 98 that generates the alert signal which is coupled to the audible alerting device 72. Alternatively, when the vibrator alert is selected as described above, the microcomputer generates an alert enable signal which is coupled through bus 92 to the I/O port 96 to enable generation of a vibratory, or silent alert. A battery saver operation is controlled by the microcomputer 80 with battery saving signals that are directed over the bus 92 to the I/O port 96 which couples to the power switch 68. Power is periodically supplied to the receiver 62 to enable decoding of the received selective call receiver address signals and any message information that is directed to the receiver.

FIG. 3 shows a debit/credit meter 77 which is a hardware memory element coupled to the decoder/controller 66 for establishing a paging service accounting system. It is contemplated that the debit/credit meter 77 is a non-volatile memory that will retain the information stored within it during battery changes. The debit/credit meter 77, when fully replenished (e.g., when the debit/credit meter is indicating the total number of available credit units), indicates the available number of credit units for enabling the user of the selective call transceiver 32 to access the received message information, including personal messages and information service data, that is stored in memory 88. The decoder/controller 66 calculates the number of credit units (or debit units) from a parameter of the stored message, preferably, from the number of characters of the stored message to be presented or displayed. Those skilled in the arts will appreciate that the parameter of the stored message may comprise other variables, such as, a time associated with the displaying or presenting of the message. A charge, in debit units, is preferably assigned to each character of the message, and the decoder/controller 66 counts (accumulates) the number of characters of the message to determine the total number of debit units. This charge, debit units, is preferably calculated at the time the personal message, i.e., not an advertisement, is stored in memory. The decoder/controller 66 then debits (subtracts) the total number of message debit units from the number of indicated or available credit units of the debit/credit meter 77. Upon debiting the number of debit units of the stored message from the indicated number of credit units of the debit/credit meter 77, the decoder/controller 66 enables access to the stored message when there is a sufficient number of available credits units in the debit/credit meter 77 (e.g., when the debit/credit meter 77 is not depleted), and disables access to the stored message when the debit/credit meter 77 is depleted. Thus, once the calculated debit units of the received message are debited from the available credit units of the debit/credit meter 77, the message is now available for display to the user 71 at no extra charge irrespective of the number of times the user views the message on the display 78. That is, the stored message is debited only once. The debit/credit meter 77 then indicates the remaining number of credit units available for subsequently received and stored messages.

Figure 5:
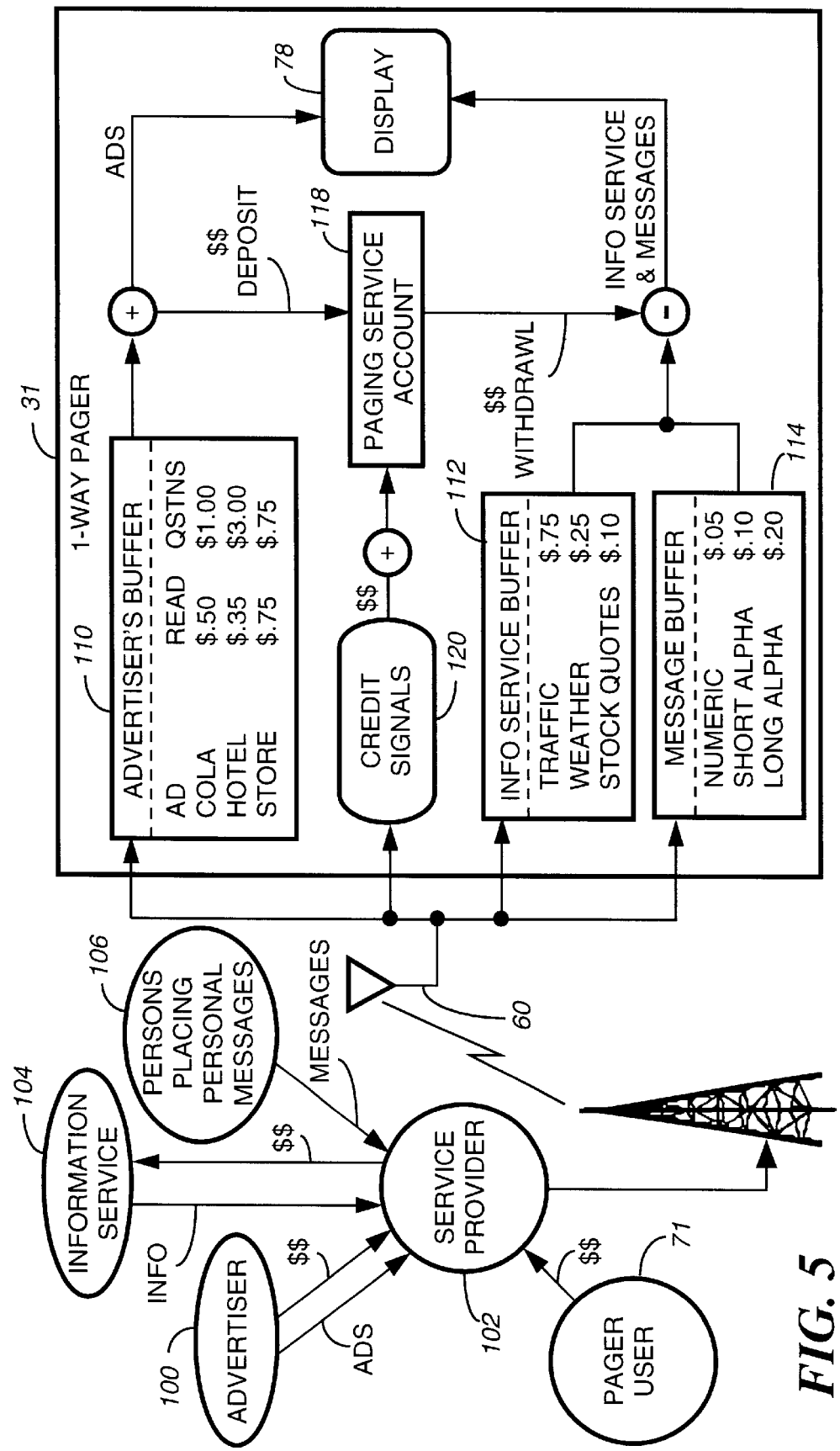
FIG. 5 is a simplified diagrammatic representation of interactions among elements of the selective call transceiver of FIG. 1

FIG. 5 is a simplified pictorial representation of software elements 110, 112, 114, 118 and 120 and the display 78 within a selective call receiver 31, or one-way pager, and of interactions among such software elements and with other elements external to the pager. An advertiser 100 places one or more advertisements, or ads, with a service provider 102 and pays to the service provider a monetary fee for such privilege. Concurrently, but independently, an information service 104 supplies to the service provider 102 information such as traffic or weather reports or stock market prices, and the service provider pays to the information provider a fee for such information. Typically, such information is regularly updated at frequent intervals soon after the contents therein becomes available to the information provider. One or more persons 106 place, without paying any fee, personal messages intended for the user 71 by telephoning the service provider. Collectively, the information supplied by the information provider and the personal messages are a first information type. The advertisements are a second information type. The service provider wirelessly transmits ads, information, and messages, as the case may be, to the one-way pager 31 via RF signals. The pager 31 intercepts RF signals through antenna 60. After receiving an RF signal and decoding an ad, the ad is stored in an advertiser's buffer 110 which is a data structure within RAM 88. After receiving an RF signal and decoding an update from an information service, the update is stored in an information service buffer 112 which is a data structure within RAM 88. After receiving an RF signal and decoding a personal message, the message is stored in a message buffer 114 which is a data structure within RAM 88.

Each ad transmitted to the pager has a preselected value assigned to it. Preferably, the system controller transmits a plurality of ads to a multiplicity of pagers during off-peak hours. Each of the plurality of ads is stored in the advertiser's buffer 110 along with the value assigned to the ad. Preferably, the value is expressed in units of money; but, alternatively, the value is expressed in terms of a number of personal messages. Preferably, the preselected value assigned to an ad is directly proportional to the size, or length, of the ad. The preselected value of a particular ad is recovered by the user 71 by the user viewing, and therefore presumably reading, the particular ad. Advantageously, the user views the ads at a time convenient to the user, and not necessarily when the user is receiving a personal message as is detrimentally required in some prior art systems. After receiving a manual request from the user, the pager presents a message, such as an ad. The user views the ad on a display 78, preferably a graphical display, using means well known in the art. All ads have a unique identification number that is displayed with the ad. In order to ensure that the user actually reads, rather than merely scrolls through, the ad, the ad is displayed for a preselected period, proportional to the length and complexity of the ad, before the user is credited with the value assigned to the ad. Software elements stored within ROM 90 cause the microcomputer 80 to automatically increment a paging service account 118 after the ad appears on the display for the preselected period of time without further action by the user 71. The size of such increment is equal to the value assigned to the ad. The paging service account 118 is a data structure in RAM 88 and is a software-oriented designation for the debit/credit meter 77 which is hardware memory and is shown in FIG. 3.

It is contemplated that all ads will have a value assigned to reading the ad, but, in additional, some ads will have questions posed to the user 71. The correct answers are also transmitted with the ad, but hidden from the user. For those ads that have questions propounded to the user 71, an additional preselected value is assigned to the successful answering by the user of the questions. It is contemplated that the ad will inform the user in some quantitative measure of the benefit of answering the questions contained within the ad and the additional benefit of conveying the actual answers to the system controller 26. The benefits of answering the questions contained within the ad accrue to the user in two steps. First, the microcomputer 80 is programmed to grade, or score, the answers and to automatically add credit to the paging service account 118. The user answers the questions using conventional user input means on the pager such as push buttons, and the microcomputer 80 determines through software elements stored in ROM 90 whether the answers are correct. If the answers are indeed correct, microcomputer 80 causes the paging service account to increase. If the answers are incorrect, the paging service account is not increased and the user merely receives credit for reading the ad. Second, in the case of a one-way pager 31, the user telephones the system controller 26 using a telephone number stated in the ad, and responds to prompts using a telephone push button keypad. The user identifies the ad using the unique identification number of the ad that appears on the display of the pager. In the case of a two-way pager 32, the pager automatically transmits the answers and the unique identification number of the ad to the system controller. In either case, the system controller determines whether the answers are correct, and if so, the system controller transmits a credit signal to the pager in order to credit the paging service account 118. The pager has software elements 120 for processing of credit signals. Software elements stored within ROM 90 cause the microcomputer 80 to automatically increment a paging service account 118 after decoding of the credit signal without further action by the user 71. The correct answers are relayed to the advertiser by the service provider along with the date and time of answering and possibly other demographic information useful to the advertiser. It is precisely because the answers to the questions in ads provide useful information to the advertiser, and possibly also to the paging service provider, that the pager user is granted additional credits. Even if the answers do not provide useful information, per se, the answers do assure an advertiser that its ad was read.

A pager 31, 32 in accordance with the invention allows a user to receive information services and personal messages in return for reading ads on the pager. Each information service subscribed to by the user has a preselected cost assigned to it. For example, a user subscribes to a stock quotation service, and the price of each stock subscribed to is continually updated at a preselected cost such as ten cents per update. It is also contemplated that each pager is capable of receiving personal messages which is the traditional use of a pager. Each personal message received by the pager has a preselected cost assigned to it. A numeric message has a lower cost than an alphanumeric message, and longer alphanumeric messages have a higher cost than shorter alphanumeric messages. Software elements stored within ROM 90 cause the microcomputer 80 to automatically decrement the paging service account 118 after decoding an information service update or a personal message without further action by the user 71. It is contemplated that a pager in accordance with the invention will not allow a user to view any information service update or any personal messages when the paging service account 118 has a value of zero. However, information service updates and personal messages will, nevertheless, be received and decoded by the pager and stored in the respective buffers 112, 114 for later presentation when the paging service account is large enough to allow such presentation. Preferably, a caution message is displayed on the display 78 when the paging service account approaches a preselected value greater than zero. Upon occurrence of the caution message, the user reads more ads, or answers more questions that appear in the ads, or does both. In the event there are no more ads to be read or questions to be answered, or in the event the user is willing to pay for paging services, the user tenders a fee to the service provider through any convenient financial transfer means, and the service provider wirelessly transmits a credit signal to the pager in order to update the paging service account 118.

Figure 6:
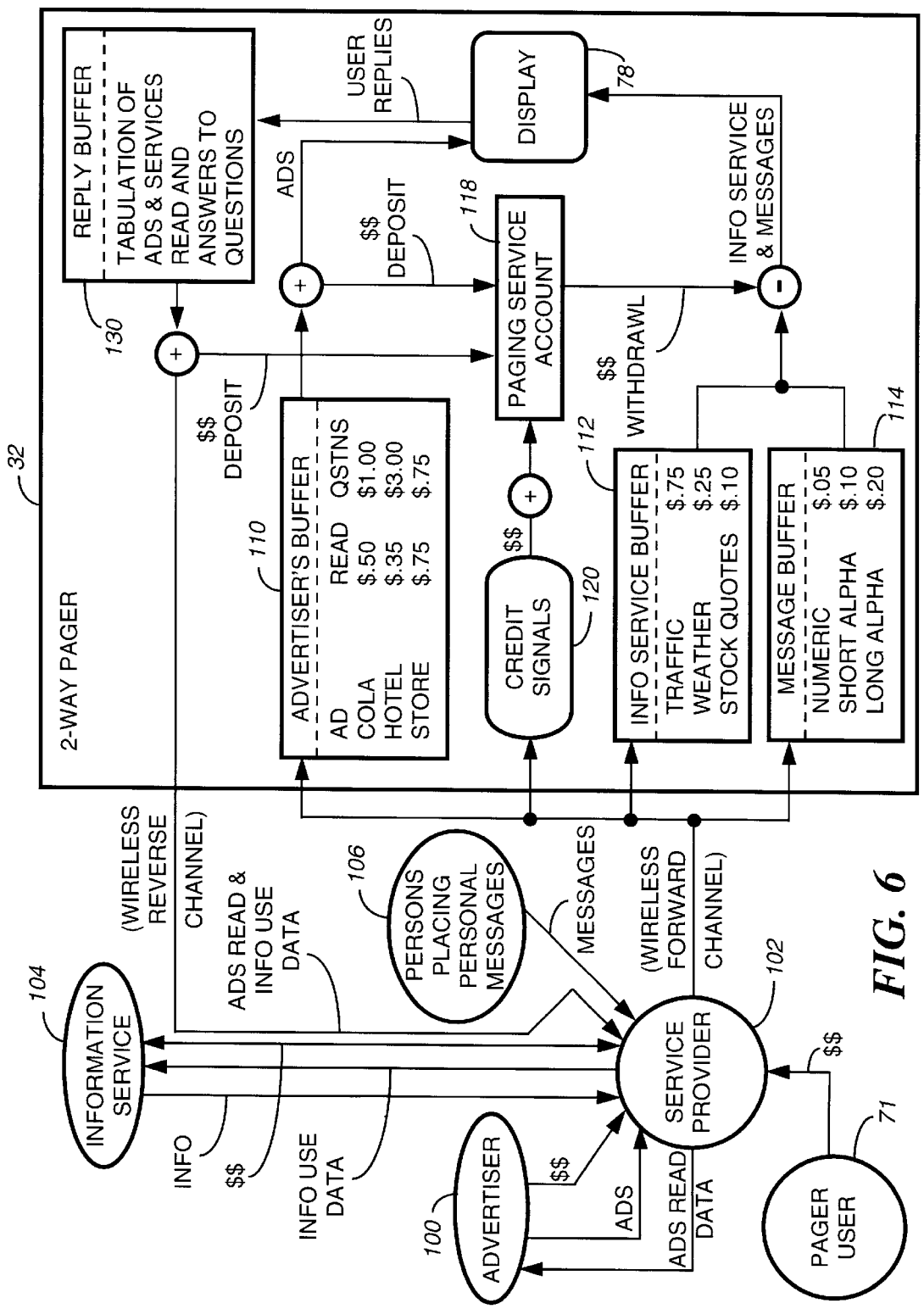
FIG. 6 is a simplified diagrammatic representation of interactions among elements of the selective call transceiver of FIG. 1

FIG. 6 is a simplified pictorial representation of software elements 110, 112, 114, 118, 120 and 130 and the display 78 within a selective call transceiver 32, or two-way pager, and of interactions among such software elements and with other elements external to the pager. The operation of the two-way pager is similar to the operation of a one-way paging except that the two-way pager also has a reply buffer 130 which is a data structure in RAM 88. Preferably, the user answers a question by depressing buttons on the pager, and in the case of a two-way pager, wirelessly transmitting an answer. The unique identification number of the ad is automatically wirelessly transmitted by the pager with the answer. When the user views an ad or answers questions within an ad, software elements in ROM 90 cause the microcomputer 80 to automatically load acknowledge-back, or reverse channel, reply messages into the reply buffer 130 for automatic transmission transparent to the user. The reply message contains answers to the questions. It is also contemplated that opinion surveys will be sent to the pager in a manner substantially similar to the manner that ads are sent to the pager. Such surveys will have questions for the user to answer, and the answers to the surveys are loaded into the reply message buffer. Similarly, but at the option of the information service entity, reverse channel reply messages are loaded into the reply buffer when the user reads information service updates. Such reverse channel transmissions are made virtually immediately, or alternatively, if the advertiser or information service wishes, made later during off-peak hours. Such reverse channel transmissions are wirelessly received by the system controller 26. Upon receiving the reverse channel reply messages from the pager, the paging service provider is capable of immediately relaying this information to the information service entity and to the advertiser as "info use data" and "ads read data", respectively, preferably by wireline. This provides the advertiser or opinion surveyor with immediate and accurate feedback of the mental impressions of the target user in exchange for financing the user's access to individual paging messages.

Figure 7:
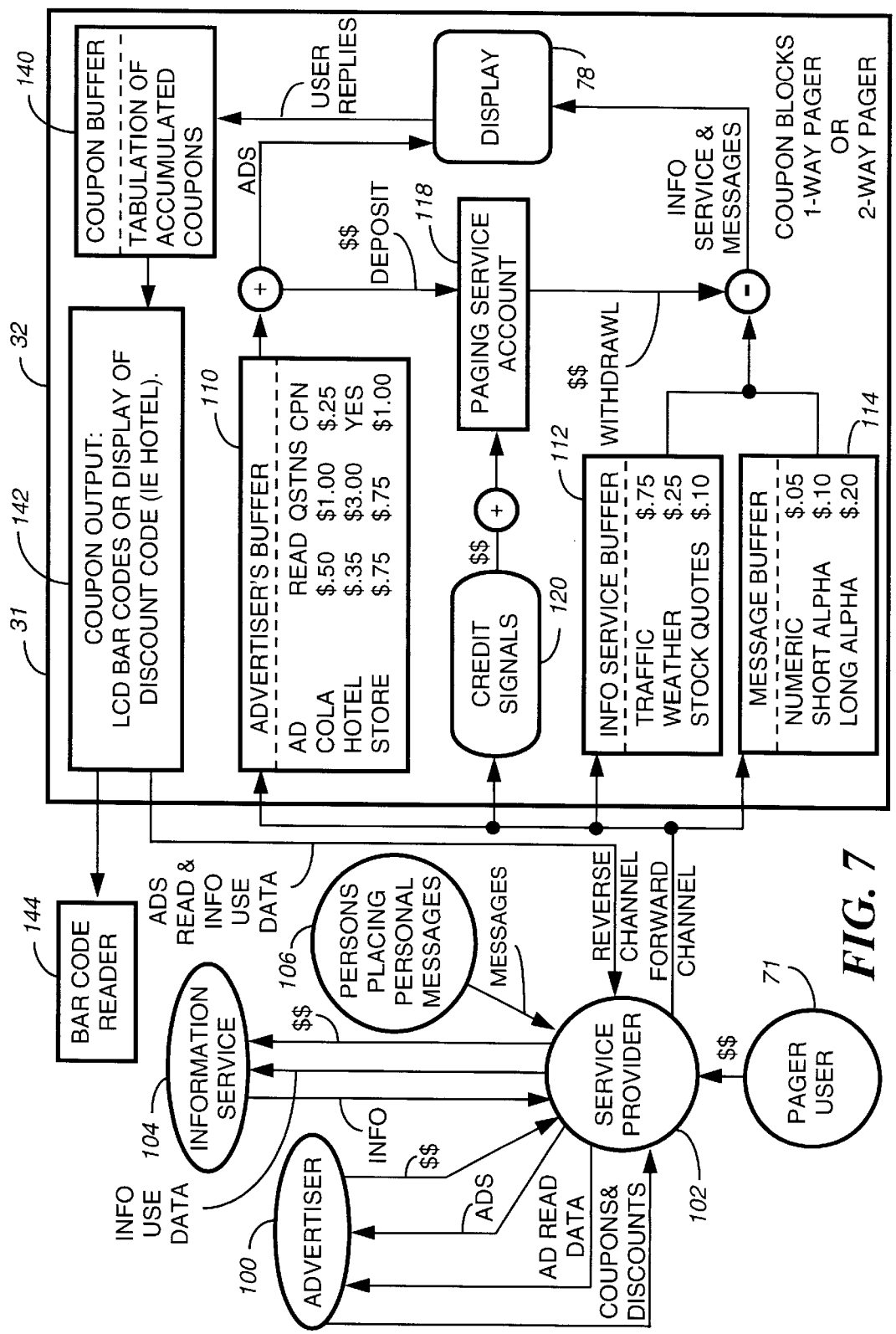
FIG. 7 is a simplified diagrammatic representation of interactions among elements of the selective call transceiver of FIG. 1
Figure 8:
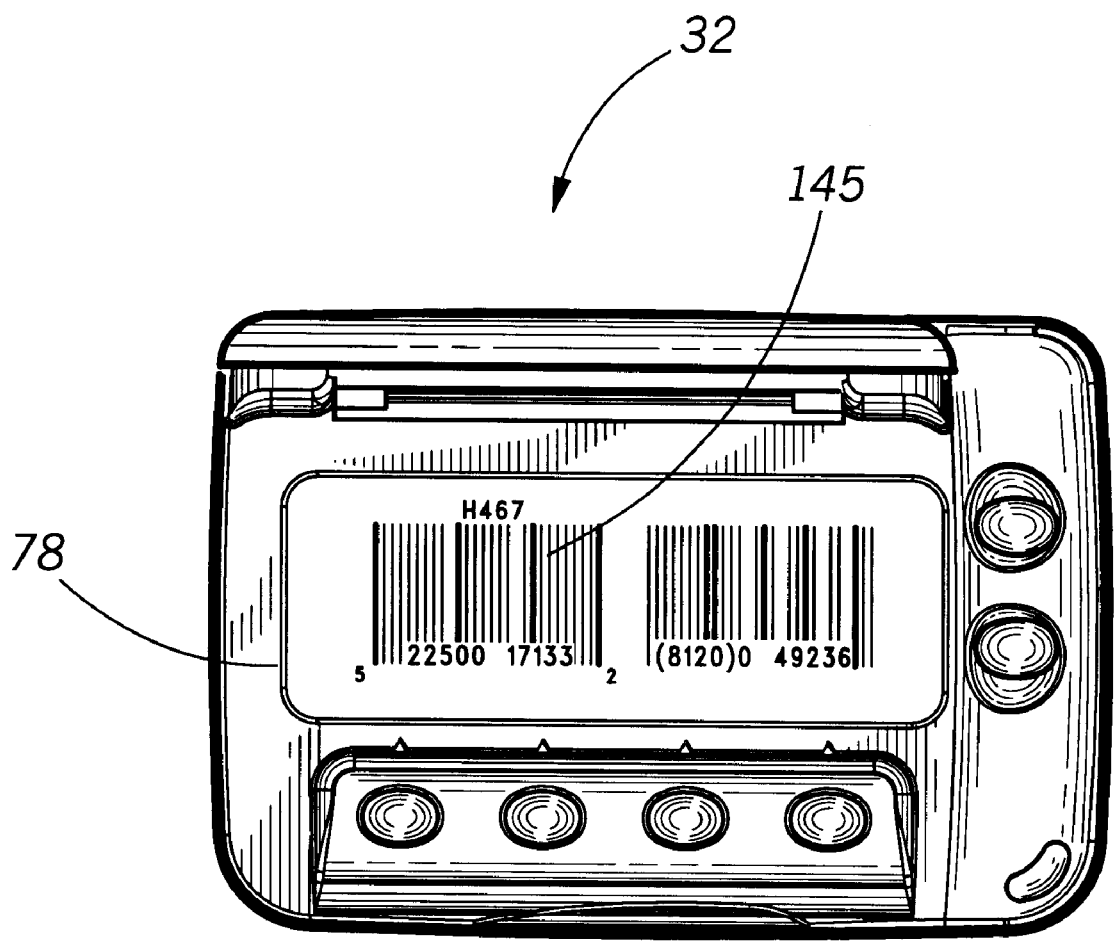
FIG. 8 shows a bar code written on a display of the selective call transceiver of FIG. 1.

FIG. 7 is a simplified pictorial representation of bar code generating software elements 110, 112, 114, 118, 120, 140 and 142 and the display 78 within a one-way pager 31 or a two-way pager 32 and of interactions among such software elements and with other elements external to the pager 31, 32. In the case of a one-way pager, the reverse channel shown in FIG. 7 is absent or is via wireline. The advertiser supplies the paging service provider with an ad containing questions, and coupon generating information. It is well known that paper coupons presently have a uniform product code, or bar code 145, printed on them, and that such bar codes are read by a bar code reader 144 such as a laser scanner typically found at supermarkets. A pager in accordance with the invention is capable of writing a coupon-style bar code on the display 78 of the pager. The bar code written on the pager corresponds to an ad read by the user on the pager. The bar code is identical to the bar code on paper coupons. Alternatively the bar code is slightly different in order to indicate that the bar code was generated by a pager; however, the bar code on the pager functions identically to a bar code on a paper coupon, that is, a discount is granted to the presenter of the coupon. Software elements residing in ROM 90 cause the microcomputer to tabulate accumulated coupons within the coupon buffer 140 after an ad is read or alternatively after the questions are answered correctly. The coupon buffer is a data structure within RAM 88, and is preferably a relatively non-volatile memory. Coupon output software elements 142 residing in ROM 90 cause the microcomputer to write the coupon bar code on the display upon the user inputting an appropriate command via conventional pager user input means such as push buttons on the pager. Typically, the user would input the appropriate command immediately before needing to present the coupon, such as when the user is in a supermarket checkout line. The user or the checkout clerk then swipes the pager across the laser scanner, the laser scanner reads the coupon, and the coupon transaction is completed. FIG. 8 shows a bar code written on a display 78 of the pager. Alternatively, instead of a coupon-style bar code written on the display, a multicharacter alphanumeric code is written on the display for visual observation and manual recordation by a sales clerk.

Figure 9:
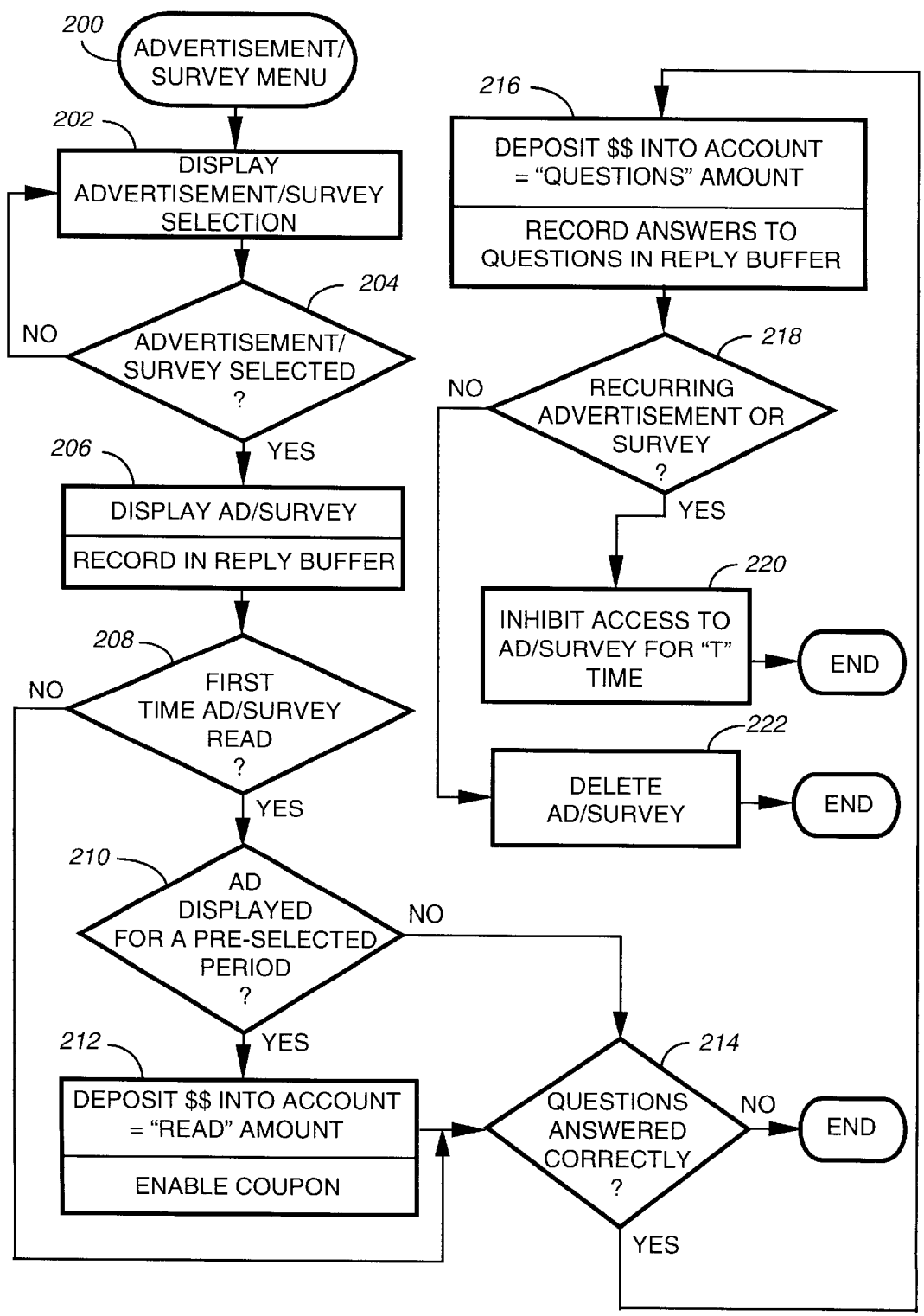
FIG. 9 is a flow diagram illustrating operation of the selective call transceiver according to FIG. 1.

FIG. 9 is a flow diagram illustrating operation of the selective call transceiver according to FIG. 1 for establishing the paging account service system in accordance with the preferred embodiment of the invention. When the user selects an advertisement/survey menu (step 200) from among available menus appearing on the display of the pager, an advertisement or survey name from among a list of advertisements and surveys appears on the display, step 202. The advertisement/survey (hereinafter ad) is selected with conventional user input means on the pager. The user either chooses to view the ad named, or scrolls through (step 204) a list of ads by returning to step 202 and viewing the name of the next ad on the list. Once an ad is selected, it is written on the display, step 206. At step 208, the displayed message is checked to determine whether it is being displayed for the first time. If the ad being displayed for the first time, the period of time that the ad appears on the display is measured in step 210. If the period of time that the ad appears on the display is greater than a preselected period, the method proceeds to step 212 where money, or a credit, is deposited into the paging service account 118 in an amount assigned to the ad, and the method proceeds to step 214. The method also proceeds directly to step 214 from step 208 if the ad had been read before. At step 214, the user is given the opportunity to answer questions appearing in the ad (or response to a survey) using conventional user input means on the pager. If the questions are answered correctly, an additional amount of money, or credit, is deposited into the paging service account 118. If survey questions were answered at step 214, the answers are loaded into the reply buffer 130 for subsequent transmission to the system controller 26. An advertiser can allow a user to view an ad more than once (step 218), but it is expected that the paging service account 118 will be credited only once. However, some ads are designed to be read more than once over a relatively long time period to encourage retention of the information conveyed in the ad. With an ad designed to be read more than once, access to the ad is inhibited, at the advertiser's option, for a preselected interval of time, T (step 220). Alternatively, an ad is deleted after one viewing (step 222).

Figure 10:
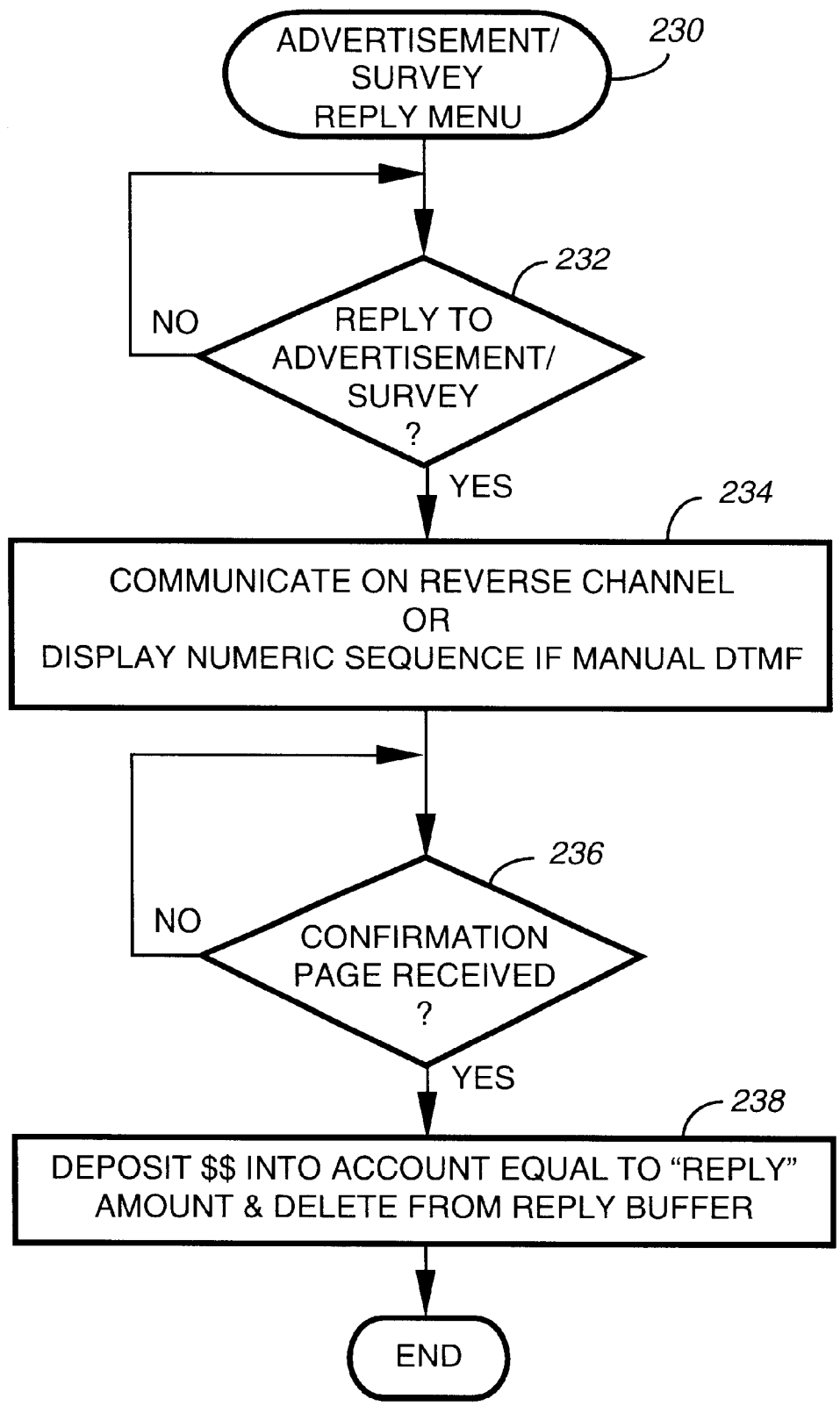
FIG. 10 is a flow diagram illustrating operation of the selective call transceiver according to FIG. 1.

FIG. 10 is a flow diagram illustrating operation of the selective call transceiver according to FIG. 1 showing the operation of the reverse channel transmitter 64 of the two-way pager 32 when the advertiser/survey reply menu is being used (step 230). At step 232, if no reply is made to a survey or if no questions are answered from an ad, then no transmission is made. However, if a survey is replied to, or if questions from an ad are answered, then at step 234 a transmission is made on the reverse channel of a signal containing the reply to the survey or answers to the questions, as the case may be. At step 236, the receiver 62 of the two-way pager 32 may receive a confirmation signal from the system controller 26, and from the confirmation signal it is determined whether the reverse channel message was received by the system controller. If the reverse channel message was successfully received by the system controller, the paging service account 118 is increased and the reply message is deleted from the reply buffer 130. If the reverse channel message was not successfully received, then the pager programmed in accordance with the invention will re-transmit the reverse channel message again.

Figure 11:
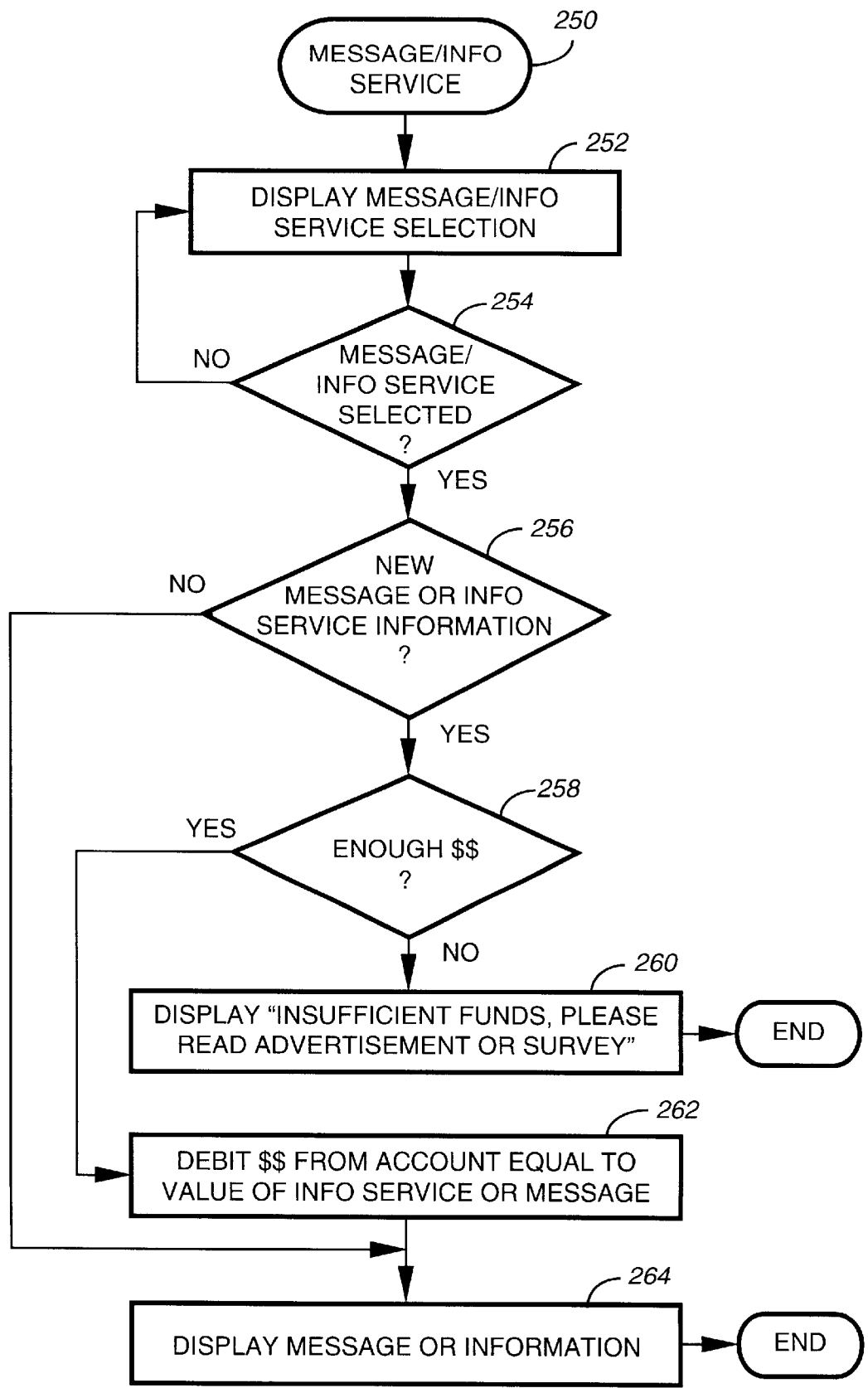
FIG. 11 is a flow diagram illustrating operation of the selective call transceiver according to FIG. 1.

FIG. 11 is a flow diagram illustrating operation of the selective call transceiver according to FIG. 1 when a user selects either a personal message service or an information service feature (collectively "message/info service") on the pager, step 250. At step 252, the user is given the choice of which services are available on the pager. At step 254, the user selects one of the services. If at step 256 the user is viewing previously received and paid for personal messages or information, the personal messages and/or information is displayed in a conventional manner (step 264). If however, the personal message or information is being viewed for the first time (e.g., is a new message) then microcomputer of the pager programmed to operate in accordance with the invention checks (step 258) whether there is enough money, or credit, in the paging service account 118. If there is not enough money, or credit, then a message to that effect is written (step 260) on the display 78. If there is enough money, or credit, then the paging service account is debited an amount equal to the value of the information or personal message (step 262). Each occurrence of the user viewing information from an information service is recognized by the microcomputer and the occurrence is loaded into the reply buffer 130 for subsequent transmission by the two-way pager. Data composed of number, nature and time of these occurrences allow the service provider and the information service the option to modify the content and nature (such as frequency of updates useful to an individual user) of the information conveyed to the user. This enables successful development of the wireless information service industry.

Figure 12:
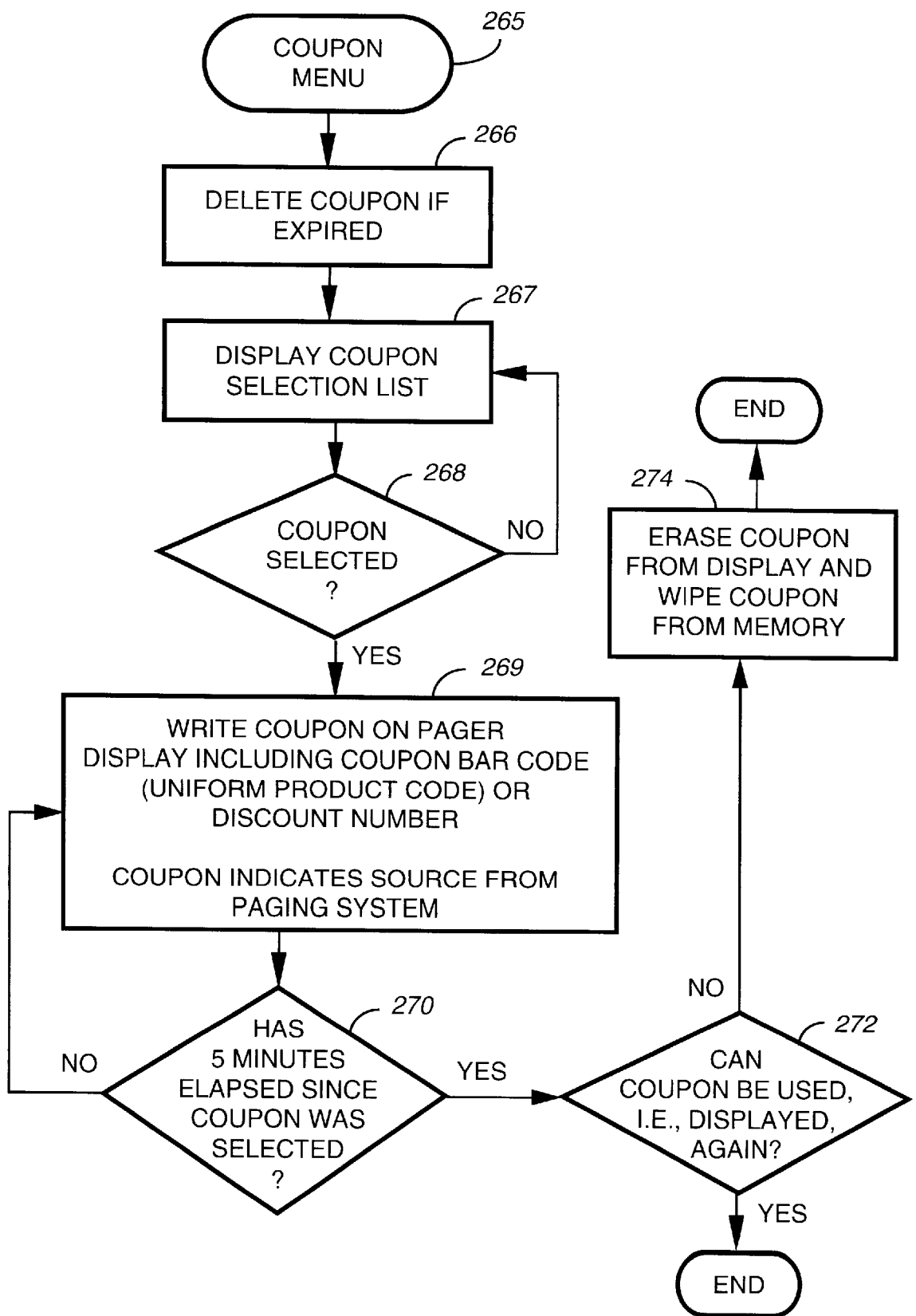
FIG. 12 is a flow diagram illustrating operation of the selective call transceiver according to FIG. 1.

FIG. 12 is a flow diagram illustrating operation of the selective call transceiver according to FIG. 1 showing the operation of the pager when the coupon menu is selected, step 265. Upon the coupon menu being selected, the microcomputer 80 programmed in accordance with the invention will check expiration dates of all coupons stored in the coupon buffer 140 and delete all expired coupons, and will display the names and discount amount of the unexpired coupons, step 266 in the coupon buffer (step 267). The user scrolls through the names of the coupons and selects a coupon at step 268. At step 269, the coupon is written on the display 78, see FIG. 8. At step 270, the time that the coupon has been displayed is measured. It is contemplated that the coupon will be displayed for a preselected limited period of time to avoid repetitive use of a coupon intended to be used only once. At step 272, it is determined whether the coupon can be used more than once. If the coupon can not be used more than one time, then at step 274, the coupon is erased from the display, and the coupon is wiped from the coupon selection list stored in RAM 88.

Thus, it will be appreciated that there has been described an advertiser pays information and messaging system for presenting messages on a selective call transceiver 32. Personal messages received on the selective call transceiver from an infrastructure are messages of a first information type, and advertisements and opinion polls, or surveys, are messages of a second information type. The system in accordance with the invention includes the transmitter 64 at the selective call transceiver for transmitting an answer signal in response to manual inputs to the selective call transceiver by the user 71 in response to the content of messages of the second information type; the receiver 30 at the infrastructure for receiving the answer signal; a controller 26 at the infrastructure for determining credit information in response to the answer signal; a transmitter 28 at the infrastructure for transmitting a credit signal having the credit information; and a microcomputer 80 at the selective call transceiver 32 for selectively inhibiting and enabling presentation of messages of the first information type in response to the credit information. Further, selective call apparatus has been described that includes a receiver 62 for receiving messages including a first information type and a second information type; a display 78 for displaying the messages; a memory, or debit/credit meter, 77 for storing credit units; and a microcomputer 80 coupled to the receiver and to the display. The microcomputer calculates a number of credit units to be added to the memory after displaying the second information type; enables display of the first information type in response to the memory having at least a predetermined number of credit units; inhibits display of the first information type in response to the memory having less than the pre- determined number of credit units; and calculates a number of credit units to be subtracted from the memory after display of the first information type.

While a detailed description of the preferred embodiment of the invention has been given, it should be appreciated that many variations can be made thereto without departing from the scope of the invention as set forth in the appended claims. For example, the invention is not limited to wireless communication, but is also applicable to any wireline communication system, such as with the internet, or to fund the information superhighway.

What is claimed is:

1. A selective call apparatus, comprising:
   a receiver for receiving an advertisement, the advertisement including an associated coupon bar code and including a plurality of questions;
   a display coupled to the receiver for presentation of the associated coupon bar code;
   a message memory coupled to the receiver for storing the advertisement;
   a manual user input device coupled to the receiver for controlling the presentation on the display of the advertisement, and for inputting answers to the plurality of questions; and
   a microcomputer coupled to the receiver for enabling presentation on the display of the associated coupon bar code in response to the answers,
   wherein the advertisement includes correct answers to the plurality of questions, and in which the microcomputer enables presentation on the display of the associated coupon bar code in response to comparing the correct answers with the answers inputted by the user through use of the manual user input device.

2. A system, including an infrastructure and at least one selective call transceiver, for controlling visible presentation of a coupon bar code at the selective call transceiver, the selective call transceiver receiving at least one advertisement from the infrastructure, comprising:
   a transmitter at the selective call transceiver for transmitting a reply message in response to presentation of the advertisement at the selective call transceiver;
   a controller at the infrastructure for receiving the reply message;
   a transmitter at the infrastructure for transmitting a coupon bar code signal; and
   a microphone at the selective call transceiver for enabling visible presentation of the coupon bar code at the selective call transceiver in response to the coupon bar code signal.

3. A system, including an infrastructure and at least one selective call transceiver, for controlling visible presentation of a coupon bar code at the selective call transceiver, the selective call transceiver receiving at least one advertisement from the infrastructure, the advertisement including at least one question, comprising:
   a transmitter at the selective call transceiver for transmitting an answer to the at least one question;
   a controller at the infrastructure for determining correctness of the answer;
   a transmitter at the infrastructure for transmitting a coupon bar code signal if the answer is correct; and
   a microcomputer at the selective call transceiver for enabling visible presentation of the coupon bar code at the selective call transceiver in response to the coupon bar code signal.

4. A method of presenting coupon bar codes on a display of a selective call apparatus, comprising the steps of:
   (a) receiving an advertisement and an associated coupon bar code;
   (b) storing the coupon bar in the selective call apparatus;
   (c) presenting on the display the advertisement;
   (d) subsequent to step (c), presenting on the display the associated coupon bar code, wherein the associated coupon bar code is presented on the display for a preselected limited period of time and is then erased from the display;
   (e) subsequent to step (d), reading the associated coupon bar code, wherein the reading includes scanning the associated coupon bar code with a laser bar code reader; and
   (f) permanently wiping from the selective call apparatus the coupon bar code to prevent further presentation of the coupon bar code on the display.

5. A method of presenting coupon bar codes on a display of a selective call apparatus, comprising the steps of:
   (a) receiving an advertisement and an associated coupon bar code;
   (b) storing the coupon bar in the selective call apparatus;
   (c) presenting on the display the advertisement; and
   (d) subsequent to step (c), presenting on the display the associated coupon bar code, wherein the associated coupon bar code is presented on the display for a preselected limited period of time and is then erased from the display; and
   (e) permanently wiping from the selective call apparatus the coupon bar code to prevent further presentation of the coupon bar code on the display.

6. A method of presenting coupons on a display of a selective call apparatus, comprising the steps of:
   (a) receiving at least one advertisement, each advertisement including an associated coupon, each coupon including an associated coupon bar code;
   (b) setting a minimum advertisement display period;
   (c) presenting on the display the advertisement; and
   (d) subsequent to step (c), presenting on the display a list of associated coupons only if, at step (c), the corresponding advertisement had been presented on the display for a period equal to or greater than the minimum advertisement display period.

7. The method of claim 6, in which the minimum advertisement display period that is set at step (b) is a fixed minimum advertisement display period pre-set in the selective call apparatus for all advertisements.

8. The method of claim 6, in which each advertisement includes an associated preselected period, and in which the minimum advertisement display period that is set at step (b) is separately set for each advertisement and is the associated preselected period that is included with the advertisement.

9. The method of claim 6, including the steps of:
   (e) selecting a selected coupon from among the list of the associated coupons; and
   (f) presenting on the display the associated coupon bar code corresponding to the selected coupon.

10. The method of claim 9, in which the advertisement includes data regarding number of times, x, the associated coupon bar code can be presented on the display, and in which step (f) is repeated no more than x times.

11. The method of claim 6, in which each advertisement includes a separate expiration date, and in which an associated coupon is included in the list presented at step (d) only prior to the occurrence of the expiration date for each associated coupon.

12. The method of claim 11, including the steps of:
   (e) selecting a selected coupon from among the list of the associated coupons; and
   (f) presenting on the display the associated coupon bar code corresponding to the selected coupon.

13. A method of presenting coupons on a display of a selective call apparatus, comprising the steps of:

(a) receiving an advertisement, each advertisement including an associated coupon bar code;
   (b) setting a minimum advertisement display period;
   (c) presenting on the display the advertisement; and
   (d) subsequent to step (c), presenting on the display the associated coupon bar code only if, at step (c), the corresponding advertisement had been presented on the display for a period equal to or greater than the minimum advertisement display period.

14. The method of claim 13, in which the minimum advertisement display period that is set at step (b) is a fixed minimum advertisement display period pre-set in the selective call apparatus.

15. The method of claim 13, in which the advertisement includes an associated preselected period, and in which the minimum advertisement display period that is set at step (b) is the associated preselected period that is included with the advertisement.

16. The method of claim 13, in which the advertisement includes data regarding number of times, x, the associated coupon bar code can be presented on the display, and including a step of:
   (e) in which step (d) is repeated no more than x times.

17. The method of claim 13, in which the advertisement includes an expiration date, and in which an associated coupon bar code is presented on the display at step (d) only prior to the occurrence of the expiration date.

* * * * *